United States Patent
Iso (10) Patent No.: US 10,366,423 B2
(45) Date of Patent: Jul. 30, 2019

(54) PROVIDING DEVICE, PROVIDING METHOD, AND RECORDING MEDIUM

(71) Applicant: YAHOO JAPAN CORPORATION, Tokyo (JP)

(72) Inventor: Ken-ichi Iso, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 579 days.

(21) Appl. No.: 14/477,433

(22) Filed: Sep. 4, 2014

(65) Prior Publication Data
US 2015/0371133 A1    Dec. 24, 2015

(30) Foreign Application Priority Data

Jun. 19, 2014 (JP) ................................ 2014-126547

(51) Int. Cl.
| | | |
|---|---|---|
| *G06N 3/04* | (2006.01) | |
| *G06N 3/08* | (2006.01) | |
| *G06Q 30/02* | (2012.01) | |

(52) U.S. Cl.
CPC ....... *G06Q 30/0283* (2013.01); *G06N 3/0454* (2013.01); *G06N 3/084* (2013.01)

(58) Field of Classification Search
None
See application file for complete search history.

(56) References Cited

U.S. PATENT DOCUMENTS

| | | | | |
|---|---|---|---|---|
| 7,249,057 B2* | 7/2007 | Hatakama | ............... | G06Q 30/02 705/26.61 |
| 2001/0004735 A1* | 6/2001 | Kindo | ..................... | G06Q 30/06 705/37 |
| 2001/0011235 A1* | 8/2001 | Kim | .................. | G06Q 10/06375 705/7.31 |
| 2002/0007340 A1* | 1/2002 | Isaf | ........................ | G06Q 30/02 705/37 |
| 2003/0144922 A1* | 7/2003 | Schrantz | ................. | G06Q 30/06 705/26.1 |
| 2011/0320364 A1* | 12/2011 | Van Horn | .............. | G06Q 30/06 705/80 |
| 2013/0339169 A1* | 12/2013 | Perach | ............... | G06Q 30/0605 705/26.2 |
| 2015/0178768 A1* | 6/2015 | Yoo | ........................ | G06Q 30/06 705/14.4 |

FOREIGN PATENT DOCUMENTS

JP    A-2009-516246    4/2009

* cited by examiner

*Primary Examiner* — Robert A Cassity
*Assistant Examiner* — Michael Zidanic
(74) *Attorney, Agent, or Firm* — Oliff PLC (57) ABSTRACT

A providing device according to an embodiment includes a registration unit that registers a learning device, in which nodes that output results of calculations on input data are connected and which extracts a feature corresponding to a predetermined type from the input data, an accepting unit that accepts designation of a type of a feature, a providing unit that selects a learning device that extracts a feature corresponding to the type of the feature accepted by the accepting unit among the learning device registered by the registration unit, and provides a new learning device generated based on the selected learning device, and a calculation unit that calculates a price to be paid to a seller provided the learning device selected by the providing unit.

6 Claims, 8 Drawing Sheets

| LEARNING DEVICE ID | PROVIDER | TYPE | ... |
|---|---|---|---|
| $N_A$ | A COMPANY | CLOTHES MANUFACTURED BY A COMPANY | ... |
| $N_B$ | B COMPANY | FEMALE | ... |
| $N_C$ | C COMPANY | MALE | ... |
| ... | ... | ... | ... |

PROVIDING DEVICE, PROVIDING METHOD, AND RECORDING MEDIUM

CROSS-REFERENCE TO RELATED APPLICATIONS

The present application claims priority to and incorporates by reference the entire contents of Japanese Patent Application No. 2014-126547 filed in Japan on Jun. 19, 2014.

BACKGROUND OF THE INVENTION

1. Field of the Invention

The present invention relates to a providing device, a providing method, and a recording medium.

2. Description of the Related Art

In recent years, there is a known technique related to deep leaning for performing learning for language recognition or image recognition by using a deep neural networks (DNN) including neurons that are connected in a multistage manner. For example, in such a technique, a DNN is constructed by learning an object or the like contained in an image of input image data. If new image data is input, what object is contained in an image is discriminated on the basis of the constructed DNN.

Patent Document 1: Japanese Laid-open Patent Publication No. 2009-516246

However, in the above described conventional technique, it is not always possible to easily use a DNN. For example, in the above described conventional technique, to construct a DNN that performs desired determination, learning is performed by using large amounts of data. Therefore, in the above described conventional technique, more effort is needed to collect pieces of training data and more time is needed to learn data. Under such circumstances, in the above described conventional technique, it is difficult to easily construct a DNN, and it is not always possible to easily use a DNN.

SUMMARY OF THE INVENTION

It is an object of the present invention to at least partially solve the problems in the conventional technology. A providing device according to an embodiment includes a registration unit that registers a learning device, in which nodes that output results of calculations on input data are connected and which extracts a feature corresponding to a predetermined type from the input data, an accepting unit that accepts designation of a type of a feature, a providing unit that selects a learning device that extracts a feature corresponding to the type of the feature accepted by the accepting unit among the learning device registered by the registration unit, and provides a new learning device generated based on the selected learning device, and a calculation unit that calculates a price to be paid to a seller provided the learning device selected by the providing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, modes (hereinafter, referred to as "embodiments") for carrying out a providing device, a providing method, and a recording medium according to the present invention will be described in detail with reference to drawings. The providing device, the providing method, and the recording medium according to the present invention are not limited by the embodiments. Further, in the following embodiments, the same components are denoted by the same reference numerals and symbols, and the same explanation will be omitted.

1. Providing Process

Figure 1:
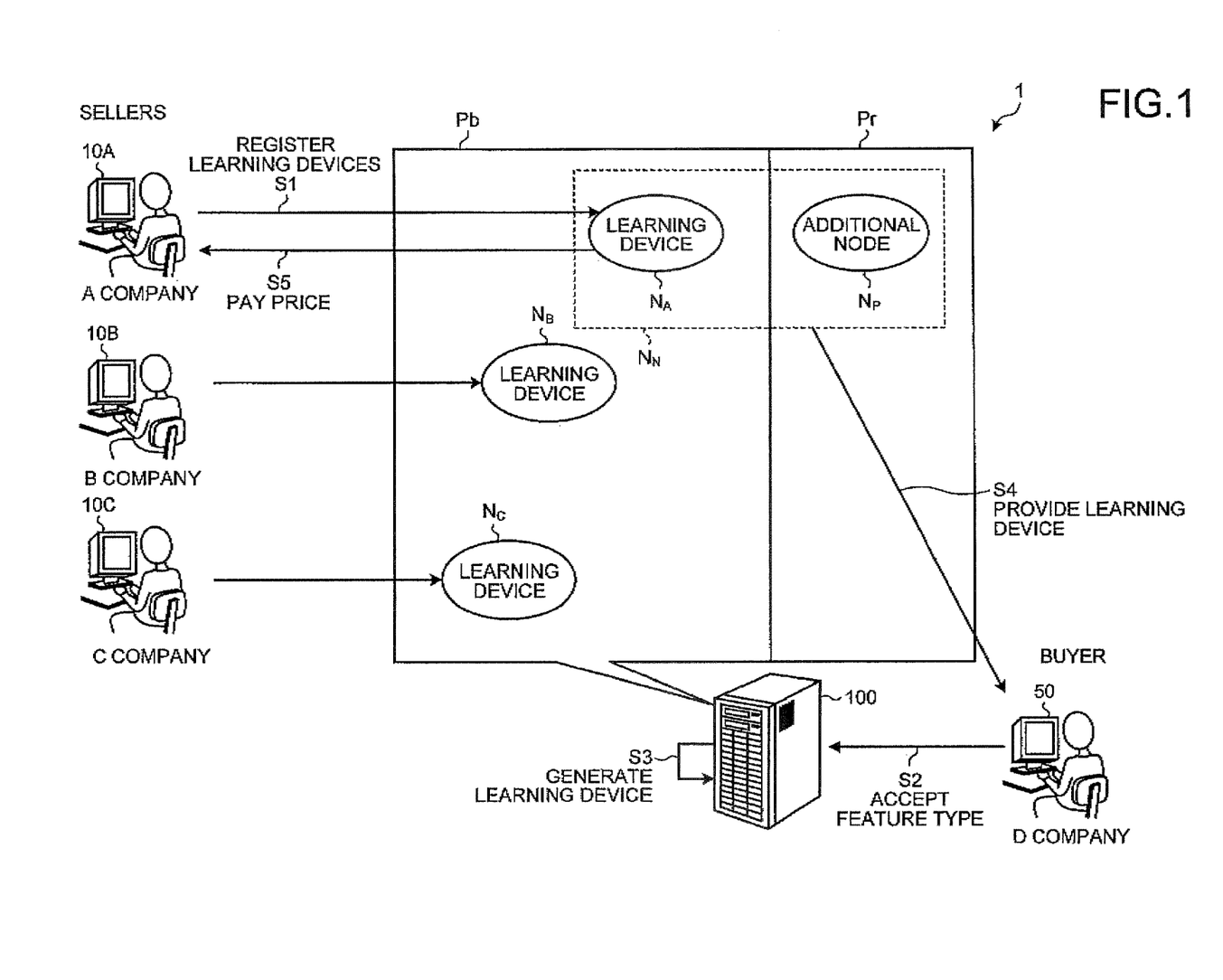
FIG. 1 is an explanatory diagram illustrating an example of a providing process performed by a providing system according to an embodiment.

First, with reference to FIG. 1, an example of a providing process according to an embodiment will be described. FIG. 1 is an explanatory diagram illustrating an example of a providing process performed by a providing system according to the embodiment. In the example in FIG. 1, a case is described in which a providing device 100 managed by an agent performs a providing process of providing a learning device (for example, a DNN). In FIG. 1, sellers indicate subjects that provide learning devices. A buyer indicates a subject that is provided with a learning device.

As illustrated in FIG. 1, a providing system 1 includes seller terminals 10A to 10C, a buyer terminal 50, and the providing device 100. The seller terminals 10A to 10C, the buyer terminal 50, and the providing device 100 are communicably connected to one another via a network and radio waves. In the following, when the seller terminals 10A to 10C are collectively described without being discriminated from one another, they may be described as a "seller terminal 10".

The seller terminal 10 and the buyer terminal 50 are information processing apparatuses, such as personal computers (PCs), tablet terminals, smartphones, mobile phones, or personal digital assistants (PDAs). The providing device 100 is a server device that performs a providing process of providing a learning device (for example, a neural networks or a DNN), in which nodes (for example, neurons) that output results of calculations on input data are connected and which extracts a feature corresponding to a predetermined type from the input data.

Herein, the providing process will be described on the assumption that the providing device 100 provides a buyer with a desired learning device by using learning devices provided by sellers. Herein, it is assumed that the sellers that provide the learning devices to the providing device 100 are an A company, a B company, and a C company as illustrated in FIG. 1. Further, it is assumed that the buyer that buys a right to use a learning device from the agent is a D company.

In the example in FIG. 1, first, the sellers operate the seller terminals 10 and provide the providing device 100 with learning devices, in which neurons that output results of calculations on input data are connected and which extract features corresponding to predetermined types from the input data. For example, an employee of the A company operates the seller terminal 10A and provides the providing device 100 with a learning device $N_A$ that is a trained DNN that extracts a feature of "clothes manufactured by the A company". Similarly, an employee of the B company operates the seller terminal 10B and provides the providing device 100 with a learning device $N_B$ that is a trained DNN that extracts a feature of "female". Further, an employee of the C company operates the seller terminal 10C and provides the providing device 100 with a learning device $N_C$ that is a trained DNN that extracts a feature of "male". Therefore, the providing device 100 registers the learning devices $N_A$ to $N_C$ provided by the A company to the C company (Step S1). For example, the providing device 100 stores the learning devices $N_A$ to $N_C$ in a public area Pb provided by the agent.

Thereafter, the providing device 100 accepts designation of a feature type (Step S2). For example, the providing device 100 accepts, from the buyer, designation of a type of a feature to be extracted from input data. It is assumed that the D company being the buyer wants to recognize "clothes manufactured by the D company" from image data and wants to have a DNN that extracts a feature of "clothes" from image data input as the input data. In this case, an employee of the D company designates "clothes" as a feature type by operating the buyer terminal 50. Consequently, the providing device 100 accepts designation of "clothes" as the feature type from the buyer terminal 50.

Subsequently, the providing device 100, on the basis of the accepted feature type, selects a learning device that extracts a feature corresponding to the accepted type from among the registered learning devices (Step S3). In this case, because the providing device 100 has accepted "clothes" as the type of the feature to be extracted from the input data, it selects a learning device capable of extracting the feature of "clothes" or a learning device capable of extracting a feature of data in a subclass contained in a class of "clothes" from among the learning devices $N_A$ to $N_C$. That is, the providing device 100 selects the learning device $N_A$ that extracts a feature of a subclass of "clothes manufactured by the A company" contained in the class of "clothes". Thereafter, the providing device 100 generates a learning device $N_N$ by adding an additional node $N_P$ (corresponding to an example of a new node) of the D company being the buyer to the learning device $N_A$ registered by a registration unit 131, and performs learning on the learning device $N_N$ so as to be able to extract clothes manufactured by the D company, to thereby generate the learning device $N_N$ that extracts a feature of clothes manufactured by the D company.

Then, the providing device 100 provides a right to use the generated learning device $N_N$ to the D company (Step S4). For example, the providing device 100 provides the learning device $N_N$ to the D company in a private area Pr, which is a private area provided by the agent and is a buyer's area available to the buyer. Meanwhile, the private area Pr is an area that is open to only the D company being the buyer and is closed to other third parties among private areas provided by the agent.

As a specific example, the providing device 100 causes connection coefficients (coupling coefficients) between nodes contained in the learning device $N_A$ to be disclosed to only the A company and causes connection coefficients between the additional node $N_P$ and other nodes to be disclosed to only the D company among connection coefficients between nodes in the learning device $N_N$. Further, when the D company uses the learning device $N_N$, the providing device 100 constructs the learning device $N_N$ by using the connection coefficients between the nodes contained in the learning device $N_A$ and the connection coefficients between the additional node $N_P$ and the other nodes, inputs the input data accepted from the D company to the learning device $N_N$, and notifies the D company of an output of the learning device $N_N$.

Thereafter, the providing device 100 calculates a price to be paid to the seller provided the learning device. Then, the agent that manages the providing device 100 pays, as a price for provision of the learning device $N_A$ to the buyer, the price calculated by the providing device 100 to the A company (Step S5). For example, when the providing device 100 provides the buyer with the learning device having been provided by the seller, the agent pays, as a price, money corresponding to the number of uses of the provided learning device to the seller. Further, for example, the agent charges the buyer a usage fee for using the learning device provided to the buyer.

In this manner, the providing device 100 according to the embodiment registers a learning device, in which nodes that output results of calculations on input data are connected and which extracts a feature corresponding to a predetermined type from the input data. Further, the providing device 100 accepts designation of a feature type. Furthermore, the providing device 100 selects a learning device that extracts a feature corresponding to the accepted feature type based on the registered learning device, and provides a new learning device generated based on the selected learning device. Moreover, the providing device 100 calculates a price to be paid to the seller provided the selected learning device.

Therefore, the providing device 100 can provide the buyer with a DNN desired by the buyer among DNNs provided by the seller, and the buyer can easily use the DNN. For example, the providing device 100 can provide the buyer with a DNN already constructed by the seller, and therefore can reduce time and effort to construct the DNN desired by the buyer.

Further, the providing device 100 can provide the DNN desired by the buyer while concealing contents of the DNNs which are registered by the sellers; therefore, the security can be ensured. Furthermore, the providing device 100 provides a learning device that outputs a result of a calculation on input data, without providing contents of data or a feature determination method that the seller has used to construct the DNN; therefore, it is possible to maintain the confidentiality of information held by a company serving as the seller.

2. Configuration of Providing Device

Figure 2:
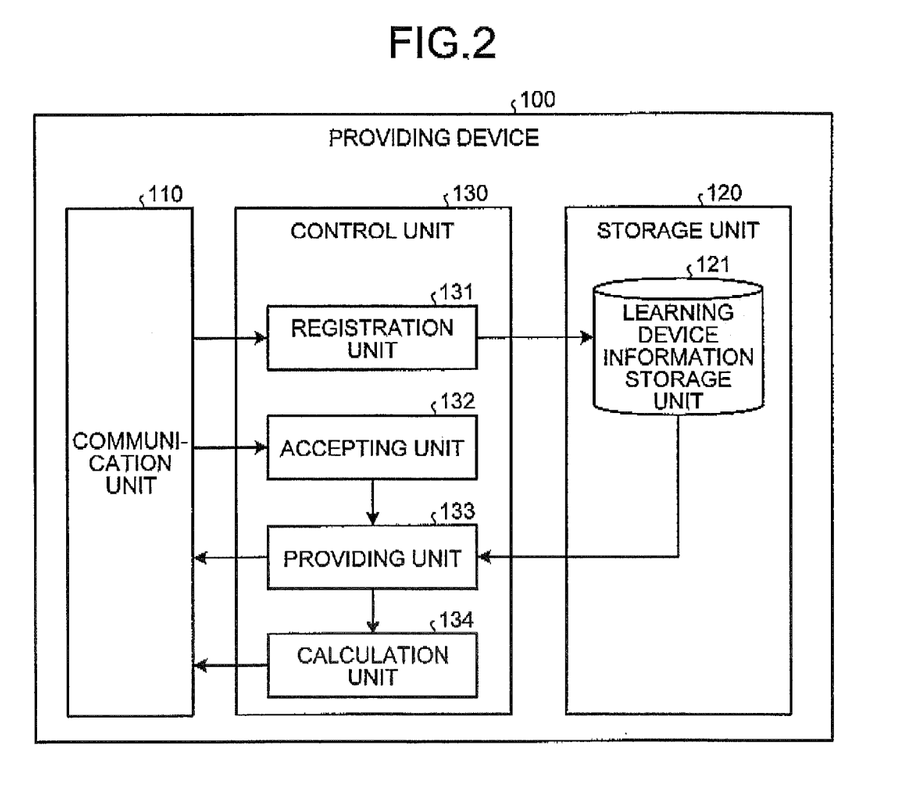
FIG. 2 is a diagram illustrating a configuration example of a providing device according to the embodiment.

Next, with reference to FIG. 2, a configuration of the providing device 100 according to the embodiment will be described. FIG. 2 is a diagram illustrating a configuration example of the providing device 100 according to the embodiment. As illustrated in FIG. 2, the providing device 100 includes a communication unit 110, a storage unit 120, and a control unit 130. The providing device 100 may include an input unit (for example, a keyboard, a mouse, or the like) that accepts various operations from an administrator or the like who uses the providing device 100, or a display unit (for example, a liquid crystal display or the like) for displaying various types of information.

Communication Unit 110

The communication unit 110 is realized by, for example, a NIC or the like. The communication unit 110 is connected to a network with or without wires, and transmits and receives information to and from the seller terminal 10 and the buyer terminal 50 via the network.

Storage Unit 120

The storage unit 120 is realized by, for example, a semiconductor memory device such as a random access memory (RAM) or a flash memory, or a storage device such as a hard disk or an optical disk. The storage unit 120 includes a learning device information storage unit 121.

Learning Device Information Storage Unit 121

Figure 3:
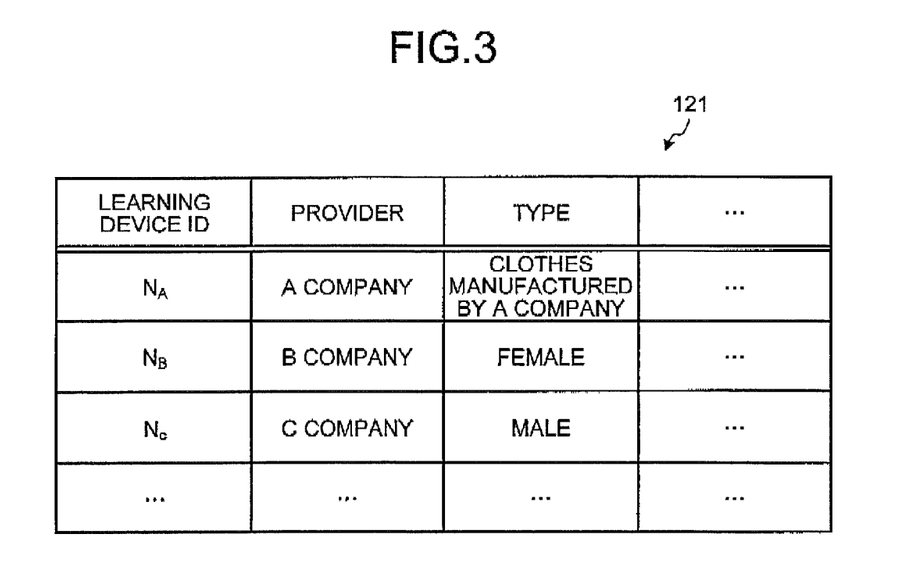
FIG. 3 is a diagram illustrating an example of a learning device information storage unit according to the embodiment.

The learning device information storage unit 121 stores therein information on learning devices. Specifically, the learning device information storage unit 121 stores therein information on a learning device, in which nodes that output results of calculations on input data are connected and which extracts a feature corresponding to a predetermined type from the input data. For example, the learning device information storage unit 121 stores therein pieces of information on the learning devices provided by the sellers. FIG. 3 illustrates an example of the learning device information storage unit 121 according to the embodiment. As illustrated in FIG. 3, the learning device information storage unit 121 stores therein items of a "learning device ID", a "provider", a "type", and the like.

The "learning device ID" indicates identification information for identifying a learning device. The "provider" indicates a seller provided the learning device corresponding to the "learning device ID" to the providing device 100. The "type" indicates a type of a feature that the learning device corresponding to the "learning device ID" can extract. Specifically, the "type" is information indicating a data class or subclass for which the learning device indicated by the associated learning device ID can extract a feature.

That is, FIG. 3 illustrates an example in which the learning device $N_A$ corresponding to a learning device ID "$N_A$" is a learning device provided by the "A company". Further, FIG. 3 illustrates an example in which the learning device $N_A$ corresponding to the learning device ID "$N_A$" is a learning device capable of extracting a feature of "clothes manufactured by the A company".

Control Unit 130

The control unit 130 is realized by, for example, causing a central processing unit (CPU), a micro processing unit (MPU), or the like to execute various programs (corresponding to an example of a providing program) stored in a storage device inside the providing device 100 by using a RAM as a work area. Further, the control unit 130 is realized by an integrated circuit, such as an application specific integrated circuit (ASIC) or a field programmable gate array (FPGA).

The control unit 130, as illustrated in FIG. 2, includes the registration unit 131, an accepting unit 132, a providing unit 133, and a calculation unit 134, and implements or executes functions and operations of information processing described below. Meanwhile, the internal configuration of the control unit 130 is not limited to the configuration illustrated in FIG. 2, and other configurations are applicable as long as the providing process to be described later is performed. Further, connection relations of the processing units of the control unit 130 are not limited to the connection relations illustrated in FIG. 2, and other connection relations are applicable.

Registration Unit 131

The registration unit 131 registers information on learning devices. Specifically, the registration unit 131 registers a learning device, in which nodes (for example, neurons) that output results of calculations on input data are connected and which extracts a feature corresponding to a predetermined type from the input data. For example, the registration unit 131 stores, in the learning device information storage unit 121, a learning device such as a neural networks or a DNN that is provided by a seller and that extracts various features, in association with the seller serving as a provider.

Accepting Unit 132

The accepting unit 132 accepts designation of a feature type. Specifically, the accepting unit 132 accepts, from the buyer, designation of a type of a feature to be extracted from input data. As one example, when the buyer desires to use a learning device that extracts a feature of "clothes" by using image data as the input data, the accepting unit 132 accepts designation of "clothes" as the feature type. For example, the accepting unit 132 provides a selection screen for selecting a feature type to the buyer terminal 50. Then, the accepting unit 132 accepts designation of a feature type from the buyer terminal 50 via the provided selection screen.

Providing Unit 133

The providing unit 133 provides a learning device to the buyer. Specifically, the providing unit 133 selects a learning device that extracts a feature corresponding to the feature type accepted by the accepting unit 132 among the learning devices registered by the registration unit 131, and provides a new learning device generated based on the selected learning device.

As one example, the providing unit 133 first selects a learning device that extracts the feature type accepted by the accepting unit 132 from among the learning devices registered by the registration unit 131. For example, when the accepting unit 132 accepts "clothes" as the feature type, the providing unit 133 selects a learning device that extracts a feature of "clothes" from among the learning devices registered by the registration unit 131. Further, for example, when a learning device that extracts the same feature as the feature accepted by the accepting unit 132 has not been registered, the providing unit 133 selects a learning device with a class or subclass based on the accepted feature. As a specific example, when the accepting unit 132 accepts "clothes" as the feature type, and if only a learning device that extracts a feature of "clothes of the A company" has been registered, the providing unit 133 selects this learning device. That is, the providing unit 133 may select a learning device that extracts a feature of data belonging to a subclass contained in the accepted class.

Then, the providing unit 133 provides the selected learning device to the buyer terminal 50 of the buyer. For example, when the buyer uses a learning device, the providing unit 133 first constructs a new learning device by using connection coefficients between nodes contained in a learning device provided by the seller and connection coefficients between an additional node and other nodes. As one example, the providing unit 133 corrects the connection coefficients by a backpropagation method or the like. That is, the providing unit 133 performs adjustment (for example, tuning) to obtain connection coefficients so that the feature accepted by the accepting unit 132 can be extracted. Then, the providing unit 133 inputs the input data accepted from the buyer to the constructed learning device, and notify the buyer of an output of this learning device. The providing unit 133 provides the learning device in the private area, which is a private area provided by the agent and is a buyer's area available to the buyer. Meanwhile, the private area is an area that is open to only the buyer and is closed to other third parties among private areas provided by the agent. Specifically, the providing unit 133 stores the generated learning device in a storage area that can be accessed by only the buyer designated the feature type among storage areas of a predetermined storage device in which learning devices are registered for providing this learning device. Incidentally, the connection coefficients between the nodes contained in the learning device provided by the seller among the connection coefficients between the nodes in the learning devices are disclosed to only the seller. On the contrary, the connection coefficients between the additional node and the other nodes are disclosed to only the buyer. Therefore, for example, the buyer can use the learning device provided by the providing unit 133 by accessing the private area Pr provided by the agent by operating the buyer terminal 50, and therefore can easily use the learning device as desired by him/herself. Further, data itself or the learning device itself is not provided to the buyer; therefore, the seller can maintain the confidentiality of information that the seller holds.

Calculation Unit 134

The calculation unit 134 calculates a price to be paid to the seller. Specifically, the calculation unit 134 calculates a price to be paid to the seller provided the learning device selected by the providing unit 133. For example, when the providing device 100 provides the buyer with the learning device having been provided by the seller, the calculation unit 134 calculates, as a price, money corresponding to the number of uses of the provided learning device. Further, the calculation unit 134 calculates the amount of money charged to the buyer. For example, the calculation unit 134 calculates, as the amount of money to be charged, a usage fee for using the learning device provided to the buyer.

3. Flow of Registration Process

Figure 4:
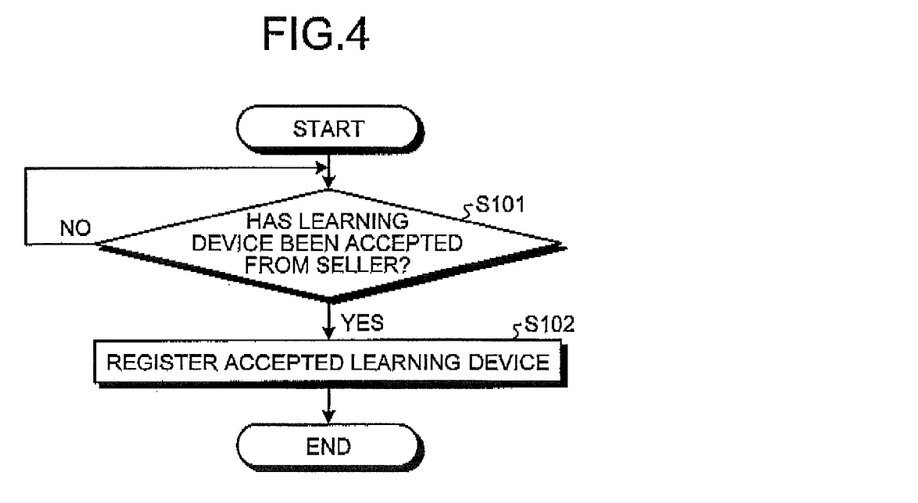
FIG. 4 is a flowchart illustrating the flow of a registration process performed by the providing device.

Next, with, reference to FIG. 4, the flow of a registration process performed by the providing device 100 according to the embodiment will be described. FIG. 4 is a flowchart illustrating the flow of the registration process performed by the providing device 100 according to the embodiment.

As illustrated in FIG. 4, the providing device 100 accepts a learning device, in which nodes (for example, neurons) that output results of calculations on input data are connected and which extracts a feature corresponding to a predetermined type from the input data (Step S101). For example, the providing device 100 accepts, from the seller terminal 10 operated by the seller, a trained learning device, such as a neural networks or a DNN, that extracts various features. If the providing device 100 has not accepted the learning device (Step S101; No), it waits until accepting the learning device.

On the contrary, when accepting the learning device (Step S101; Yes), the providing device 100 registers the accepted learning device (Step S102). For example, the providing device 100 registers the learning device, such as a neural networks or a DNN, which is provided by the seller and which extracts various features, in the learning device information storage unit 121 in association with the seller serving as a provider.

4. Flow of Providing Process

Figure 5:
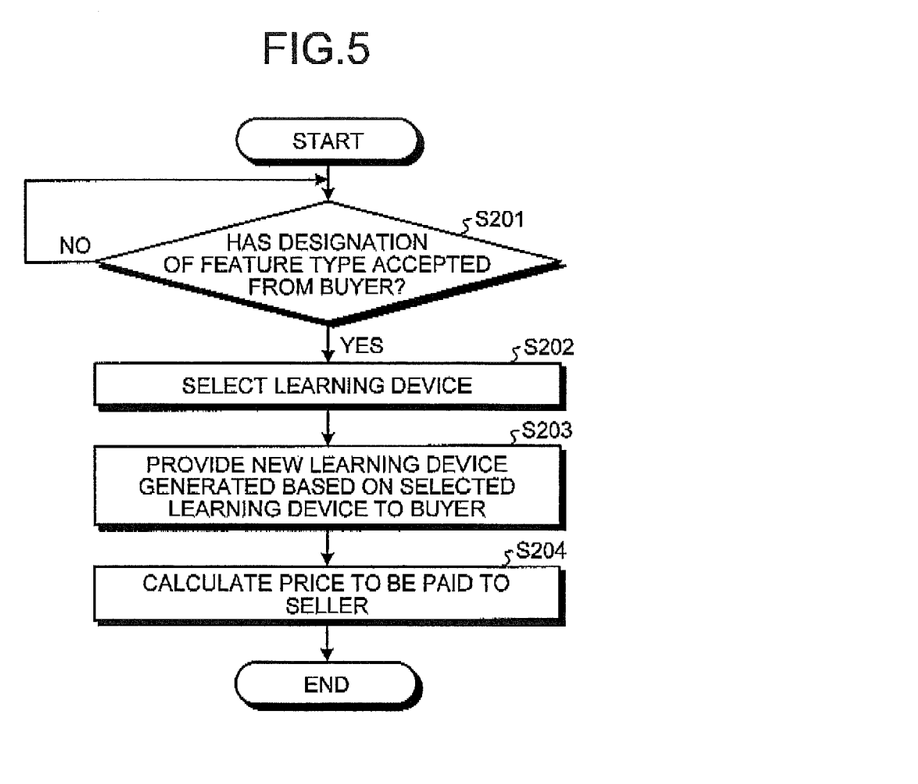
FIG. 5 is a flowchart illustrating the flow of a providing process performed by the providing device.

Next, with reference to FIG. 5, the flow of a providing process performed by the providing device 100 according to the embodiment will be described. FIG. 5 is a flowchart illustrating the flow of the providing process performed by the providing device 100 according to the embodiment.

As illustrated in FIG. 5, the providing device 100 accepts designation of a feature type (Step S201). For example, the providing device 100 accepts, from the buyer terminal 50 operated by the buyer, designation of a type of a feature to be extracted from input data. If the providing device 100 has not accepted the designation of the feature type (Step S201; No), it waits until accepting the designation of the feature type.

On the contrary, when accepting the designation of the feature type (Step S201; Yes), the providing device 100 selects a learning device that extracts a feature corresponding to the accepted type among registered learning devices based on the accepted feature type (Step S202). For example, the providing device 100 selects a learning device that extracts the feature corresponding to the accepted type among the learning devices stored in the learning device information storage unit 121.

Then, the providing device 100 provides a new learning device generated based on the selected learning device to the buyer (Step S203). For example, the providing device 100 sets an additional node in the private area Pr, which is a private area provided by the agent and is a buyer's area available to the buyer, and sets a new learning device by adding the additional node to the selected learning device. Subsequently, the providing device 100 performs learning on the newly-set learning device so as to extract a feature corresponding to the accepted type. Then, the providing device 100 gives the buyer a right to use the new learning device on which the learning has been performed. Thereafter, the providing device 100 calculates a price to be paid to the seller provided the learning device having been provided (Step S204). For example, when the providing device 100 provides the buyer with the learning device provided by the seller, the providing device 100 calculates, as a price, money corresponding to the number of uses of the provided learning device.

5. Modified Example

The providing device 100 according to the above described embodiment may be embodied in various different forms other than the above described embodiment. Therefore, in the following, other embodiments of the above described providing device 100 will be described.

5-1. Generation of Learning Device

In the above described embodiment, an example has been described in which the providing device 100 provides a learning device that extracts a feature corresponding to an accepted type among the learning devices registered by the registration unit 131. Meanwhile, the providing device 100 may provide the buyer with a learning device that is generated by using multiple learning devices.

Specifically, the providing device 100 generates, from multiple learning devices registered by the registration unit 131, a learning device that extracts a feature corresponding to a type accepted by the accepting unit 132, and provides the new learning device.

Figure 6:
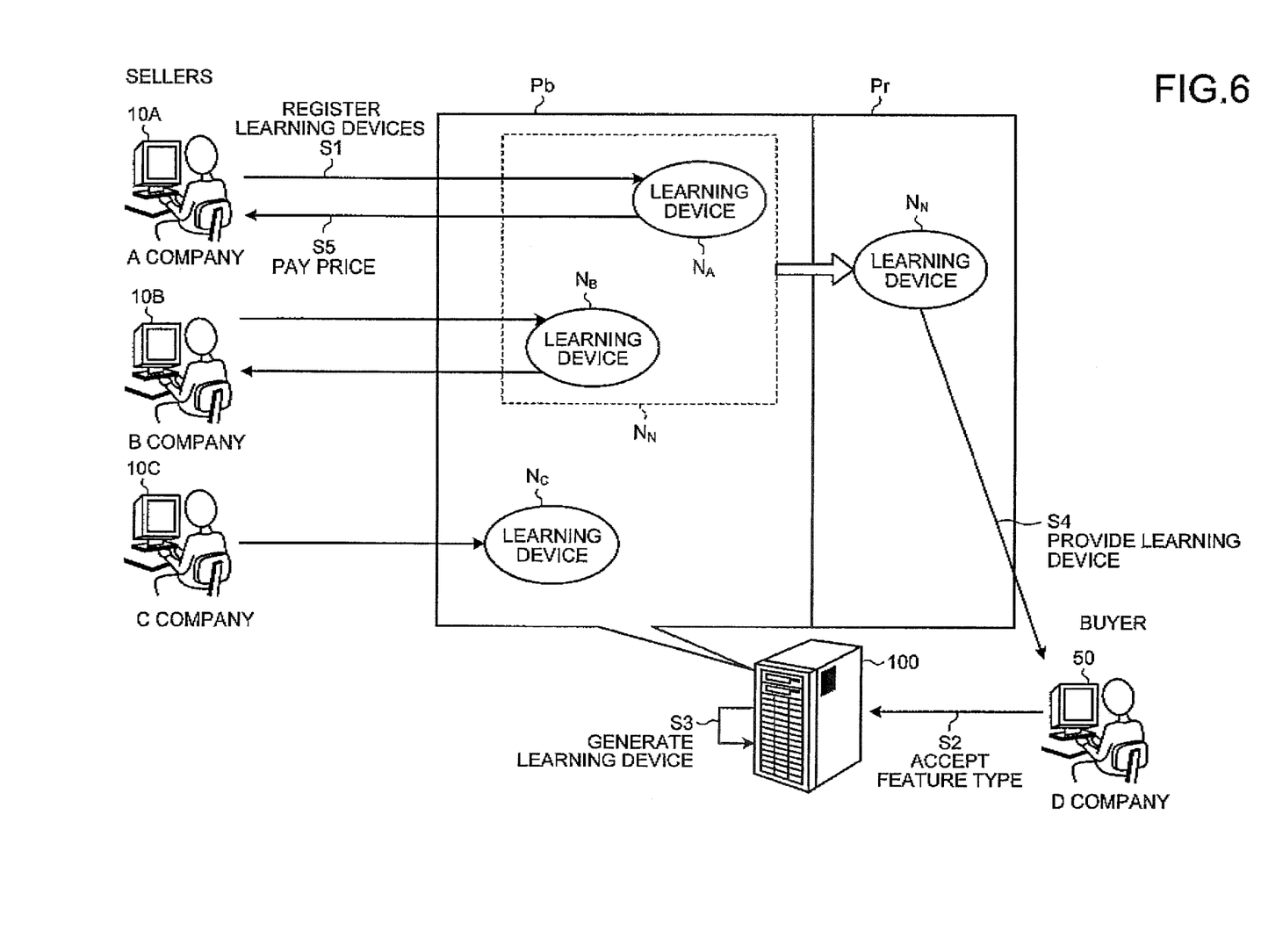
FIG. 6 is an explanatory diagram illustrating an example of a providing process performed by a providing system according to a modified example.

This will be described with reference to FIG. 6. FIG. 6 is a diagram for explaining an example of a providing process performed by a providing system according to the modified example. As illustrated in FIG. 6, as compared to the case in FIG. 1, the providing device 100, after accepting designation of a type of a feature to be extracted from input data (Step S2), generates the new learning device $N_N$ that extracts a feature corresponding to the accepted type (Step S3). Specifically, the providing device 100 generates the new learning device that extracts the feature accepted by the accepting unit 132, from multiple learning devices registered by the registration unit 131.

In the example in FIG. 6, it is assumed that the D company being the buyer designates "female wearing clothes manufactured by the A company" as a feature type. In this case, the providing device 100 generates the new learning device $N_N$, which is a DNN that extracts the feature of "female wearing clothes manufactured by the A company", by using the learning device $N_A$ that is a DNN that extracts a feature of "clothes manufactured by the A company" and the learning device $N_B$ that is a DNN that extracts a feature of "female". At this time, for example, the providing device 100 generates the new learning device $N_N$ by using the learning device $N_A$ and the learning device $N_B$ in the private area Pr provided by the agent. Meanwhile, the providing device 100 may generate the learning device that extracts the feature corresponding to the accepted type by using a learning device provided by the buyer rather than the learning devices registered by the registration unit 131. Then, the providing device 100 provides the buyer with the generated learning device $N_N$ (Step S4). For example, the providing device 100 provides the D company with the learning device $N_N$ in the private area Pr, which is a private area provided by the agent and is a buyer's area available to the buyer. In this case, the providing device 100 calculates prices to be paid to the A company provided the learning device $N_A$ and to the B company provided the learning device $N_B$. Then, the agent pays the prices calculated by the providing device 100 to the A company and the B company (Step S5).

In this manner, the providing device 100 generates a learning device that extracts a feature corresponding to a type accepted by the accepting unit 132 from the multiple learning devices registered by the registration unit 131, and provides the new learning device.

Consequently, the providing device 100 can provide a learning device desired by the buyer even when the very learning device that extracts a feature corresponding to a type desired by the buyer has not been registered; therefore, it is possible to increase variations of learning devices that can be provided. As a result, for example, the providing device 100 can improve the convenience for the buyer, and therefore can increase the number of contracts for the right to use the learning device.

5-2. Integration of Learning Devices (1)

In the above described modified example, an example has been described in which the providing device 100 generates a learning device that extracts a feature corresponding to a type accepted by the accepting unit 132, from multiple learning devices registered by the registration unit 131. Meanwhile, the providing device 100 may provide a learning device in which multiple learning devices are integrated by various methods. Specifically, the providing device 100 provides a learning device in which multiple learning devices that extract different type features among the learning devices registered by the registration unit 131 are integrated.

Figure 7:
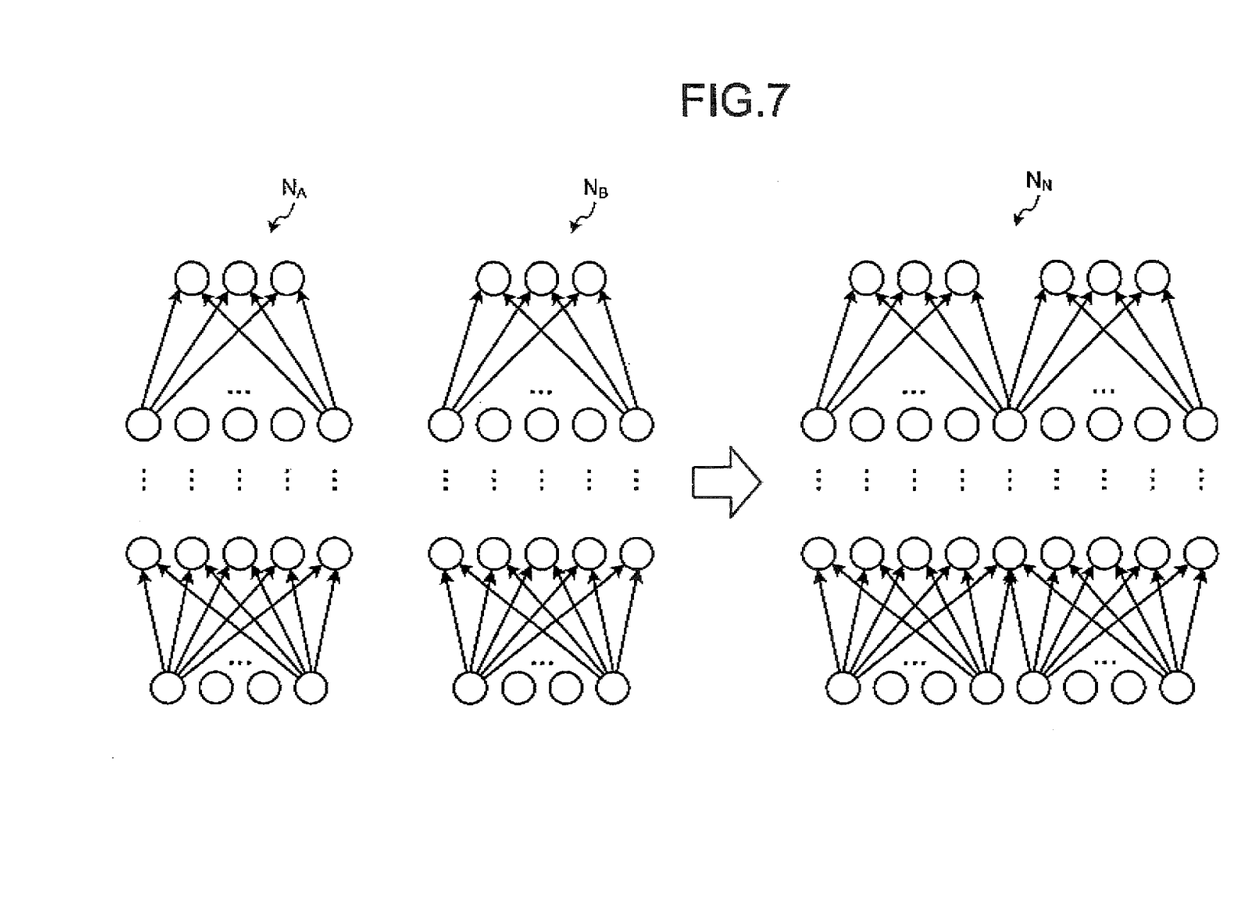
FIG. 7 is a diagram illustrating an example of a learning device.

This will be described with reference to FIG. 7. FIG. 7 is a diagram illustrating an example of the learning device. In the example in FIG. 7, the providing device 100 integrates the learning device $N_A$ and the learning device $N_B$ that extract different type features among the learning devices registered by the registration unit 131. As one example, as illustrated in FIG. 7, the providing device 100 integrates the learning device $N_A$ and the learning device $N_B$ in parallel. In this case, the providing device 100 may newly set connection coefficients between nodes included in the learning device $N_A$ and nodes included in the learning device $N_B$. Then, the providing device 100 corrects coupling coefficients between neurons such that an error between an input and an output can be reduced as much as possible in the learning device $N_N$ in which the learning device $N_A$ and the learning device $N_B$ are integrated. Consequently, the providing device 100 generates the new learning device $N_N$ in which the learning device $N_A$ and the learning device $N_B$ are integrated. For example, the providing device 100 may generate the learning device $N_N$ that causes extraction of a feature by the learning device $N_A$ and extraction of a feature by the learning device $N_B$ to be performed in parallel and outputs a logical sum or a logical product of the extraction results. Then, the providing device 100 provides the buyer with the integrated learning device $N_N$.

In this manner, the providing device 100 provides a learning device, in which multiple learning devices that extract different type features among the learning devices registered by the registration unit 131 are integrated.

Consequently, even when the very learning device that extracts a feature corresponding to a type desired by the buyer has not been registered, the providing device 100 can provide a learning device desired by the buyer by integrating already-registered learning devices.

5-3. Integration of Learning Devices (2)

In the above described modified example, an example has been described in which the providing device 100 generates a learning device that extracts a feature corresponding to a type accepted by the accepting unit 132, from the multiple learning devices registered by the registration unit 131. Meanwhile, the providing device 100 may provide a learning device, in which coupling coefficients between nodes in the same positional relations in multiple learning devices having the same number of nodes in each of layers among multiple learning devices that extract different type features are integrated.

Figure 8:
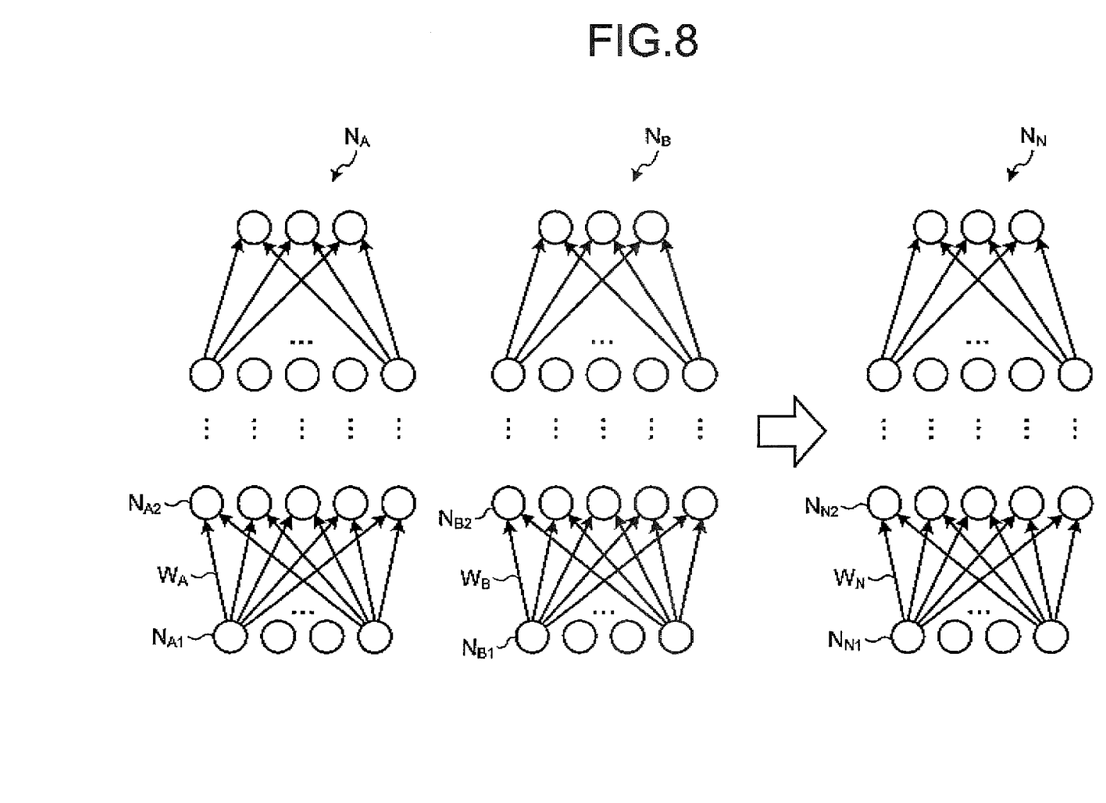
FIG. 8 is a diagram illustrating an example of the learning device.

This will be described with reference to FIG. 8. FIG. 8 is a diagram illustrating an example of the learning device. In the example in FIG. 8, the providing device 100 generates the new learning device $N_N$ by integrating the learning device $N_A$ and the learning device $N_B$ that extract different type features among the learning devices registered by the registration unit 131.

As one example, the providing device 100 synthesizes coupling coefficients between nodes in the same positions. For example, as illustrated in FIG. 8, it is assumed that the learning device $N_A$ and the learning device $N_B$ are learning devices that have the same number of layers in neuron groups contained in the learning devices and have the same number of neurons in each of the layers. Further, it is assumed that a coupling coefficient between a neuron $N_{A1}$ and a neuron $N_{A2}$ contained in the learning device $N_A$ is a coupling coefficient $W_A$. Furthermore, a coupling coefficient between a neuron $N_{B1}$ and a neuron $N_{B2}$ contained in the learning device $N_B$ is a coupling coefficient $W_B$. Moreover, a coupling coefficient between a neuron $N_{N1}$ and a neuron $N_{N2}$ contained in the learning device $N_N$ is a coupling coefficient $W_N$. Meanwhile, it is assumed that the neuron $N_{A1}$, the neuron $M_{B1}$, and the neuron $M_{N1}$ are neurons in the same position in the same layer. Furthermore, it is assumed that the neuron $N_{A2}$, the neuron $N_{B2}$, and the neuron $N_{N2}$ are neurons in the same position in the same layer. In this case, the providing device 100 calculates the coupling coefficient $W_N$ by synthesizing the coupling coefficient $W_A$ and the coupling coefficient $W_B$ such that a relation among the coupling coefficient $W_A$, the coupling coefficient $W_B$, and the coupling coefficient $W_N$ is represented by Equation (1) below.

$$W_N = \alpha W_A + (1-\alpha) W_B \quad (1)$$

Incidentally, "α" in Equation (1) is a weight coefficient whose value is arbitrarily set according to recognition required in the integrated learning device. Further, if two or more integrations are performed, for example, a mean value among the integrations is employed.

In this manner, the providing device 100 provides a learning device, in which coupling coefficients between nodes in the same positional relations in multiple learning devices having the same number of nodes in each of layers among multiple learning devices that extract different type features are integrated.

Consequently, even when the very learning device that extracts a feature corresponding to a type desired by the buyer has not been registered, the providing device 100 can provide a learning device desired by the buyer by integrating already-registered learning devices.

5-4. Integration of Learning Devices (3)

In the above described modified example, an example has been described in which the providing device 100 generates a learning deice that extracts a feature corresponding to a type accepted by the accepting unit 132, from the multiple learning devices registered by the registration unit 131. Meanwhile, the providing device 100 may provide a learning device in which multiple learning devices that extract different type features are integrated in series.

Figure 9:
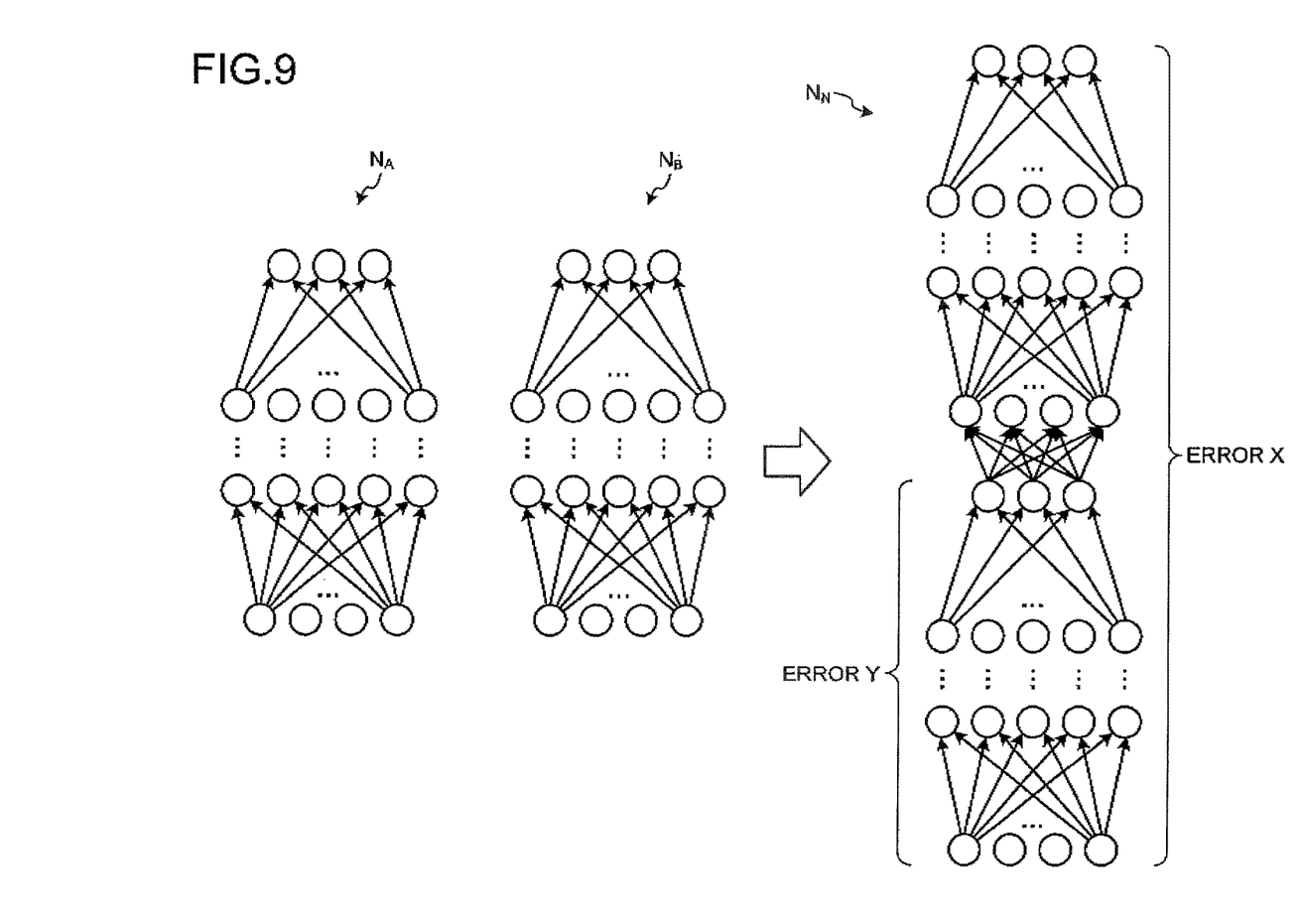
FIG. 9 is a diagram illustrating an example of the learning device.

This will be described with reference to FIG. 9. FIG. 9 is a diagram illustrating an example of the learning device. In the example in FIG. 9, the providing device 100 integrates the learning device $N_A$ and the learning device $N_B$ that extract different type features among the learning devices registered by the registration unit 131. As one example, as illustrated in FIG. 9, the providing device 100 integrates the learning device $N_A$ and the learning device $N_B$ in series.

Then, the providing device 100 corrects coupling coefficients between neurons such that an error between an input and an output can be reduced as much as possible in the learning device $N_N$ in which the learning device $N_A$ and the learning device $N_B$ are integrated. For example, the providing device 100 corrects coupling coefficients between neurons such that an error X between an input and an output of the learning device $N_N$ can be reduced as much as possible. Further, the providing device 100 corrects coupling coefficients between neurons such that an error Y between an input and an output of a learning device corresponding to the lower stage of the learning device $N_N$ can be reduced as much as possible. Consequently, the providing device 100 generates the new learning device $N_N$ in which the learning device $N_A$ and the learning device $N_B$ are integrated. Then, the providing device 100 provides the buyer with the integrated learning device $N_N$.

In this manner, the providing device 100 provides a learning device in which multiple learning devices that extract different type features are integrated in series. Therefore, even when the very learning device that extracts a feature corresponding to a type desired by the buyer has not been registered, the providing device 100 can provide a learning device desired by the buyer by integrating already-registered learning devices.

Incidentally, the providing device 100 may generate the learning device $N_{11}$ by appropriately combining the above described arbitrary methods.

5-5. Correction of Coupling Coefficient by Backpropagation Method

In the above described modified example, an example has been described in which the providing device 100 corrects coupling coefficients of an integrated learning device. Meanwhile, the providing device 100 may provide a learning device in which an error between an input and an output in the integrated learning device is corrected by a backpropagation method.

Specifically, the providing device 100 corrects a coupling coefficient such that an error between an input and an output of the integrated learning device is minimized. As one example, the providing device 100 corrects coupling coefficients so as to output correct output results with respect to as many pieces of input data as possible. Therefore, the providing device 100 can reduce a prediction error in an output layer.

For example, the providing device 100 corrects coupling coefficients between neurons in the integrated learning device to coupling coefficients that minimize the error, in order from a coupling coefficient between neurons located closest to the higher-level layer among the neurons contained in the learning device. That is, the providing device 100 corrects the coupling coefficients in order from a coupling coefficient between neurons located in the output layer side among the neurons contained in the learning device.

In this manner, the providing device 100 provides a learning device in which an error between an input and an output in the integrated learning device is corrected by the backpropagation method. Therefore, the providing device 100 can provide a learning device, in which an error between an input and an output is reduced and which has high discrimination accuracy.

5-6. Provision of Learning Device that Extracts Predetermined Feature

In the above described modified example, an example has been described in which the providing device 100 generates a learning device that extracts a feature corresponding to a type accepted by the accepting unit 132, from the multiple learning devices registered by the registration unit 131. Meanwhile, the providing device 100 may generate a learning device by adding an additional learning device to a learning device registered by the registration unit 131.

Specifically, the providing device 100 generates a learning device that extracts a predetermined feature by adding an additional learning device to a learning device that extracts a predetermined feature accepted by the accepting unit 132, and provides the new learning device. This will be described with reference to FIG. 1. In the example in FIG. 1, an example has been described in which the providing device 100 generates the new learning device $N_N$ by adding a node to the learning device $N_A$. As compared to the example in FIG. 1, the providing device 100 generates the new learning device $N_N$ that extracts a predetermined feature by adding an additional learning device $N_P$, instead of a node, to the learning device $N_A$. Specifically, the providing device 100 generates the new learning device $N_N$ by adding the additional learning device $N_P$ of the D company being the buyer to the learning device $N_A$ registered by the registration unit 131. Consequently, the providing device 100 can generate the learning device $N_N$ that extracts a predetermined feature.

For example, it is assumed that the D company being the buyer designates "clothes manufactured by the A company" as a feature type. Further, it is assumed that the D company has the additional learning device $N_P$ that is a DNN that extracts a feature of "clothes manufactured by the D company" and which is a trained DNN. In this case, the providing device 100 adds the additional learning device $N_P$ of the D company to the learning device $N_A$ that is a DNN that extracts the feature of "clothes manufactured by the A company", to thereby generate the learning device $N_N$ serving as a DNN that extracts the feature of "clothes manufactured by the A company and clothes manufactured by the D company".

As one example, the providing device 100 generates a learning device, in which an error between an output result obtained when the additional learning device is added to the learning device that extracts the predetermined feature accepted by the accepting unit 132 and a correct output result is eliminated by a correction by the backpropagation method.

Specifically, the providing device 100 calculates a coupling coefficient that minimizes an error between an output result obtained when new data is input to the DNN and a correct output result corresponding to the new data. For example, the providing device 100 calculates coupling coefficients so as to output correct output results with respect to as many pieces of input data as possible.

As one example, the providing device 100 calculates, as coupling coefficients between a new neuron contained in the additional learning device $N_P$ and neurons contained in the learning device $N_A$, coupling coefficients that minimize the error, in order from a coupling coefficient with respect to a neuron located closest to the higher-level layer among other neurons contained in the learning device $N_N$. Further, the providing device 100 calculates coupling coefficients between the new neuron and upper-stage neurons located in the output layer side relative to a layer to which the new neuron is added among other neurons.

Here, the providing device 100 calculates, as the coupling coefficients between the new neuron and the other neurons, coupling coefficients such that coupling coefficients between other neurons other than the new neuron become constant and such that the error is minimized. Consequently, the providing device 100 generates the new learning device $N_N$ in which the coupling coefficients are corrected by the backpropagation method.

Incidentally, the providing device 100 generates the new learning device $N_N$ in, for example, the private area Pr, which is a private area provided by the agent and is a buyer's area available to the buyer. As one example, the providing device 100 generates the new learning device $N_N$ in the area Pr by using the additional learning device $N_P$ that the buyer has stored in the private area Pr or by using secret training data. Meanwhile, the providing device 100 may generate the learning device $N_N$ on a public area Pb provided by the agent, rather than the private area Pr.

Further, the learning device $N_N$ desired by the buyer may be generated by the buyer terminal 50 operated by the buyer, rather than the providing device 100. In this case, for example, the buyer operates the buyer terminal 50 to generate the learning device $N_N$ by using the learning device $N_A$ provided by the providing device 100 and the additional learning device $N_P$ held by the buyer. Then, for example, the buyer operates the buyer terminal 50 to store the generated learning device N in the private area Pr or the public area Pb of the agent.

Then, the providing device 100 provides a learning device that extracts a predetermined feature accepted by the accepting unit 132. As one example, the providing device 100 provides the learning device $N_N$ that extracts the accepted predetermined feature in the private area Pr, which is a private area provided by the agent and is a buyer's area available to the buyer. For example, the providing device 100 gives the buyer a right to use the learning device $N_N$ on the private area Pr. Therefore, the buyer can use the learning device $N_N$ that extracts the desired feature on a learning-device area dedicated to the buyer, so that the security can be ensured. For example, the buyer can prevent leakage of confidential information when using own confidential information as input data to be input to the learning device $N_N$.

In this manner, the providing device 100 adds an additional learning device to a learning device that extracts a predetermined feature accepted by the accepting unit 132 to thereby generate a learning device that extracts the accepted predetermined feature, and provides the new learning device.

Consequently, the providing device 100 can generate a learning device that extracts a predetermined feature; therefore, it is possible to provide a learning device desired by the buyer by utilizing already-registered learning devices and the learning device held by the buyer.

Further, the providing device 100 provides a learning device, in which an error between an output result obtained when the additional learning device is added to the learning device that extracts the predetermined feature accepted by the accepting unit 132 and a correct output result is eliminated by a correction by the backpropagation method. Therefore, the providing device 100 can provide a learning device, in which the error in the output result is reduced and which has high discrimination accuracy.

Furthermore, the providing device 100 provides the learning device that extracts the predetermined feature accepted by the accepting unit 132 in the buyer's area. Therefore, the providing device 100 can use the generated learning device in a network area dedicated to the buyer, so that the security can be ensured. For example, the buyer can prevent leakage of confidential information when using own confidential information as input data to be input to the learning device.

5-7. DNN

In the above described embodiment, an example has been described in which the providing device 100 provides a learning device that is a DNN that extracts a feature corresponding to a type accepted by the accepting unit 132. The DNN provided by the providing device 100 includes an arbitrary number of neuron groups. For example, the DNN provided by the providing device 100 is a multi-stage DNN containing multiple neuron groups in intermediate layers. Further, the neuron groups contained in the DNN are formed of an arbitrary number of neurons. Furthermore, each of the neurons contained in the DNN is not limited to the above described example, and the neurons may be combined by various known conventional techniques.

5-8. Application Target

In the above described embodiment, an example has been described in which the providing device 100 is applied to image recognition for discriminating objects drawn in the image data. However, the providing device 100 may be applied to various recognitions rather than the image recognition. For example, the providing device 100 is applied to speech recognition in which speech is targeted. Consequently, the providing device 100 can discriminate speakers by inputting speech data as input data. For example, the providing device 100 can discriminate sex, age, or the like of a speaker who has given a speech contained in the speech data.

In another example, the providing device 100 is applied such that a stock price is targeted. Consequently, the providing device 100 can discriminate pieces of information on a stock price by inputting time series data of stock priced or industrial sectors as input data. For example, the providing device 100 can discriminate industrial sectors by discriminating movement of stock prices.

5-9. Price

In the above described embodiment, an example has been described in which the agent that manages the providing device 100 pays, as a price, money corresponding to the quality of the provided learning device to the seller when the providing device 100 provides the buyer with the learning device having been provided by the seller. However, the agent may pay the price to the seller when, for example, the agent registers the learning device having been provided by the seller, rather than when the agent provides the buyer with the learning device having been provided by the seller. Further, the agent may pay the price to the seller when the providing device 100 generates a new learning device by using the learning device having been provided by the seller.

Therefore, the providing device 100 can pay a greater amount of prices to the seller when the provided learning device is used by the buyer more frequently; therefore, it becomes possible to increase the motivation of the seller to provide the learning device.

5-10. Provided Data

In the above described modified example, an example has been described in which the providing device 100 provides a learning device that extracts a feature corresponding to an accepted type. However, the providing device 100 may provide the buyer with a DNN in various forms.

For example, the providing device 100 provides the buyer with the learning device $N_N$ having a learning range that is added by adding the additional learning device N to the learning device $N_A$. That is, the providing device 100 provides the buyer with the learning device $N_A$ that extracts a feature of "clothes" and the learning device $N_N$ that extracts a feature of "female clothes".

In another example, the providing device 100 provides the buyer with only a learning range that is added by adding the additional learning device $N_P$ to the learning device $N_A$. That is, the providing device 100 provides the buyer with the learning device $N_N$ that extracts the feature of "female clothes".

In still another example, the providing device 100 provides the buyer with a usage right to use the generated learning device $N_N$. In this case, for example, the providing device 100, when input data to be input to the learning device $N_N$ is provided by the buyer, provides the buyer with an output result on the input data. Therefore, the providing device 100 provides the buyer with only the output result, so that the configuration of the DNN can be undisclosed. Therefore, the providing device 100 can prevent leakage of, for example, contents of data or a feature determination method that the seller has used to construct the learning device, and prevent leakage of coupling coefficients between neurons of the CNN.

5-11. Others

Of the processes described in the embodiments, all or part of a process described as being performed automatically may also be performed manually. Alternatively, all or part of a process described as being performed manually may also be performed automatically by known methods. In addition, the processing procedures, specific names, and information including various types of data and parameters illustrated in the above-described document and drawings may be arbitrarily changed unless otherwise specified. For example, various types of information illustrated in the drawings are not limited to those illustrated in the drawings.

Further, the components of the devices illustrated in the drawings are functionally conceptual and do not necessarily have to be physically configured in the manner illustrated in the drawings. That is, specific forms of distribution and integration of the devices are not limited to those illustrated in the drawings, and all or part of the devices may be functionally or physically distributed or integrated in arbitrary units depending on various loads or use conditions. For example, the registration unit 131 and the accepting unit 132 illustrated in FIG. 2 may be integrated with each other.

5-12. Hardware Configuration

Figure 10:
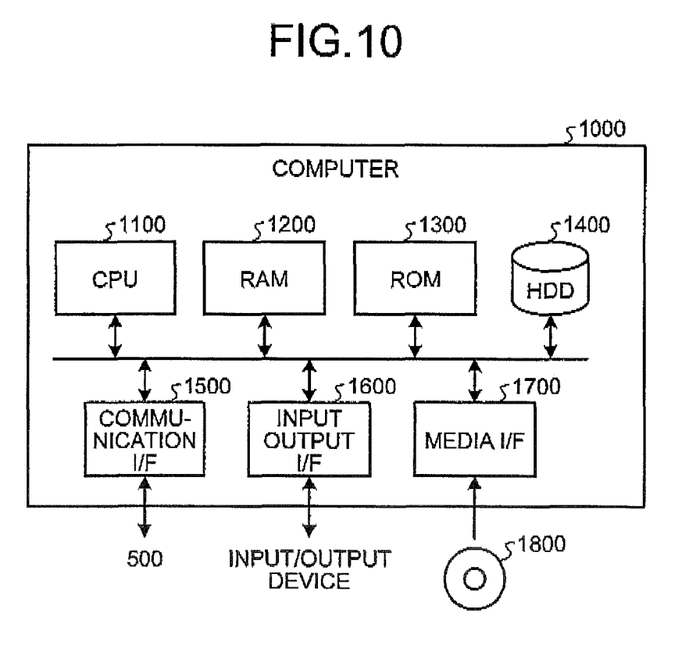
FIG. 10 is a hardware configuration diagram illustrating an example of a computer that implements functions of the providing device.

The above described providing device 100 according to the embodiment is realized by a computer 1000 as illustrated in FIG. 10 for example. Hereinafter, the providing device 100 will be described as an example. FIG. 10 is a hardware configuration diagram illustrating an example of the computer 1000 that implements the functions of the providing device 100. The computer 1000 includes a CPU 1100, a RAM 1200, a ROM 1300, an HDD 1400, a communication interface (I/F) 1500, an input output interface (I/F) 1600, and a media interface (I/F) 1700.

The CPU 1100 operates based on programs stored in the ROM 1300 or the HDD 1400, and controls each unit. The ROM 1300 stores therein a boot program executed by the CPU 1100 when the computer 1000 is activated, a program dependent on the hardware of the computer 1000, or the like.

The HDD 1400 stores therein a program executed by the CPU 1100 and data or the like used by the program. The communication interface 1500 receives data from other devices via a communication network 500, sends the data to the CPU 1100, and transmits data generated by the CPU 1100 to other devices via the communication network 500.

The CPU 1100 controls an output device, such as a display or a printer, and an input device, such as a keyboard or a mouse, via the input output interface 1600. The CPU 1100 acquires data from the input device via the input output interface 1600. Further, the CPU 1100 outputs generated data to the output device via the input output interface 1600.

The media interface 1700 reads programs and data stored in a recording medium 1800, and provides them to the CPU 1100 via the RAM 1200. The CPU 1100 loads the programs from the recording medium 1800 onto the RAM 1200 via the media interface 1700, and execute the loaded programs. The recording medium 1800 is, for example, an optical recording medium such as a digital versatile disc (DVD) or a phase change rewritable disk (PD), a magneto-optical recording medium such as a magneto optical (MO) disk, a tape medium, a magnetic recording medium, a semiconductor memory, or the like.

For example, when the computer 1000 functions as the providing device 100 according to the embodiment, the CPU 1100 of the computer 1000 executes the programs loaded on the RAM 1200, to thereby realize the functions of the control unit 130. Further, the HDD 1400 stores therein data stored in the storage unit 120. The CPU 1100 of the computer 1000 reads the programs from the recording medium 1800 and executes the programs; however, as another example, the programs may be acquired from the other devices via the communication network 500.

6. Advantageous Effects

As described above, the providing device 100 according to the embodiment includes the registration unit 131, the accepting unit 132, and the providing unit 133. The registration unit 131 registers a learning device, in which nodes that output results of calculations on input data are connected and which extracts a feature corresponding to a predetermined type from the input data. The accepting unit 132 accepts designation of a type of a feature. The providing unit 133 selects a learning device that extracts a feature corresponding to the type of the feature accepted by the accepting unit 132 among the learning device registered by the registration unit 131, and provides a new learning device that is generated based on the selected learning device. Further, the calculation unit 134 calculates a price to be paid to a seller provided the selected learning device selected by the providing unit 133.

Therefore, the providing device 100 according to the embodiment can provide the buyer with a DNN desired by the buyer among the DNNs provided by the seller, so that the buyer can easily use the DNN. For example, the providing device 100 can provide the buyer with a DNN already constructed by the seller, and therefore can reduce time and effort to construct the DNN desired by the buyer.

Further, in the providing device 100 according to the modified example, the providing unit 133 generates the new learning device that extracts the feature accepted by the accepting unit 132 from multiple learning devices registered by the registration unit 131, and provides the new learning device.

Consequently, the providing device 100 according to the modified example can provide a learning device desired by the buyer even when the very learning device that extracts a feature corresponding to a type desired by the buyer is not registered; therefore, it is possible to increase variations of learning devices that can be provided. As a result, for example, the providing device 100 can improve the convenience for the buyer, and therefore can increase the number of contracts for the right to use the learning device.

Furthermore, in the providing device 100 according to the modified example, the providing unit 133 provides a learning device in which multiple learning devices that extract different type features among learning devices registered by the registration unit 131 are integrated.

Therefore, even when the very learning device that extracts a feature corresponding to a type desired by the buyer has not been registered, the providing device 100 according to the modified example can provide a learning device desired by the buyer by integrating already-registered learning devices.

Moreover, in the providing device 100 according to the modified example, the providing unit 133 provides a learning device in which coupling coefficients between nodes in the same positional relations in multiple learning devices having the same number of nodes in each of layers among multiple learning devices that extract different type features are integrated.

Therefore, even when the very learning device that extracts a feature corresponding to a type desired by the buyer has not been registered, the providing device 100 according to the modified example can provide a learning device desired by the buyer by integrating already-registered learning devices with each other.

Furthermore, in the providing device 100 according to the modified example, the providing unit 133 provides a learning device in which multiple learning devices that extract different type features are integrated in series.

Therefore, even when the very learning device that extracts a feature corresponding to a type desired by the buyer has not been registered, the providing device 100 according to the modified example can provide a learning device desired by the buyer by integrating already-registered learning devices.

Moreover, in the providing device 100 according to the modified example, the providing unit 133 provides a learning device in which an error between an input and an output in the integrated learning device is corrected by a back-propagation method.

Therefore, the providing device 100 according to the modified example can provide a learning device, in which an error between an input and an output is reduced and which has high discrimination accuracy.

Furthermore, in the providing device 100 according to the modified example, the providing unit 133 generates a learning device that extracts a feature corresponding to an accepted type by adding a new node to the selected learning device, and provides the new learning device.

Therefore, the providing device 100 according to the modified example can generate a learning device that extracts a predetermined feature, so that it is possible to provide a learning device desired by the buyer by utilizing the already-registered learning device and the learning device held by the buyer.

Moreover, in the providing device 100 according to the modified example, the providing unit 133 provides a learning device in which an error between an output result obtained when the new node is added to the selected learning device and a correct output result is eliminated by a correction by the backpropagation method.

Therefore, the providing device 100 according to the modified example can provide a learning device, in which an error in an output result is reduced and which has high discrimination accuracy.

Furthermore, in the providing device 100 according to the modified example, the providing unit 133 stores the generated learning device in a storage area to be accessed by only a buyer designated the feature type among storage areas of a predetermined storage device in which a learning device is registered, for providing the learning device.

Therefore, the providing device 100 according to the modified example can use the generated learning device in a network area dedicated to the buyer, so that the security can be ensured. For example, the buyer can prevent leakage of confidential information when using own confidential information as input data to be input to the learning device.

While the embodiments of the present invention have been explained in detail above based on the drawings, the embodiments are described by way of example, and the present invention may be embodied in various other forms with various changes or modifications based on knowledge of person having ordinary skill in the art, in addition to the embodiments described in this specification.

According to an embodiment of the present invention, it is possible to easily use a DNN.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deep neural network (DNN) server that provides search results based on a newly-constructed DNN that is generated based on user selection of a feature-type, the deep neural network server comprising:
   a memory;
   a network communication interface configured to communicate with three or more terminal devices over a network; and
   a processor programmed to:
   receive, from a first terminal device, first identification information regarding a first trained DNN device, and receive, from a second terminal device, second identification information regarding a second trained DNN device, each of the first and second trained DNN devices having nodes: (i) that output results of calculations on input data, (ii) that are respectively connected to each other, and (iii) that perform feature extraction to obtain image or speech recognition results based on user input, the first trained DNN and the second trained DNN extracting different types of features;

register, by storing, in the memory, as registered trained DNN device information, the first identification information and the second identification information, the first identification information and the second identification information indicating types of features that the respective trained DNN devices are capable of extracting;

accept designation, over the network via the network communication interface, from a third terminal device of a user, of a feature type that is to be extracted;

select at least two registered trained DNN devices that are capable of extracting respective types of features relevant to the designated feature type among the registered trained DNN devices having the registered trained DNN device information;

construct a new DNN device without the conventional learning time period restraints by newly setting connection coefficients between the nodes included in the at least two registered DNN devices, and adding together the newly set connection coefficients between the nodes contained in the at least two registered DNN devices;

correct the newly-set connection coefficients, by a backpropagation method, which corrects the newly-set coupling coefficients in order from a coupling coefficient between nodes located in an output layer side of the newly-constructed DNN from nodes contained in a learning device, so as to reduce an error between an input and an output in the newly-constructed DNN;

extract the designated feature type in parallel, by the at least two registered DNN devices in the corrected newly-constructed DNN, and output a logical sum or a logical product of the extraction results of the designated feature type; and transmit, to the third user terminal, the logical sum or the logical product of the extraction results of the designated feature type from the corrected newly-constructed DNN device, thereby the providing device provides the third user terminal with a newly-constructed DNN that is desired by a user of the third user terminal from among DNNs that are already constructed, and the user of the third user terminal can use the newly-constructed DNN without the conventional time period requirement for construction.

2. The DNN server according to claim 1, wherein the constructed new DNN device integrates the selected at least two trained DNN devices that each are capable of extracting the designated feature type integrated in series.

3. A method for a deep neural network (DNN) server that provides search results after user-selection-driven DNN construction from registered DNNs, the method being implemented by a processor, and comprising:

receiving, from a first terminal device, first identification information regarding a first trained DNN device, and receive, from a second terminal device, second identification information regarding a second trained DNN device, each of the first and second trained DNN devices having nodes: (i) that output results of calculations on input data, (ii) that are respectively connected to each other, and (iii) that perform feature extraction to obtain image or speech recognition results based on user input, the first trained DNN and the second trained DNN extracting different types of features;

registering, by storing, in a memory, as registered trained DNN device information, the first identification information and the second identification information, the first identification information and the second identification information indicating types of features that the respective trained DNN devices are capable of extracting;

accepting designation, over the network via the network communication interface, from a third terminal device of a user, a user selection of a feature type that is to be extracted;

selecting at least two registered trained DNN devices that are capable of extracting respective types of features relevant to the designated feature type among the registered trained DNN devices having the registered trained DNN device information;

constructing a new DNN device without the conventional learning time period restraints device by newly setting connection coefficients between the nodes included in the at least two registered DNN devices, and adding together the newly set connection coefficients between the nodes contained in the at least two registered DNN devices;

correcting the newly-set connection coefficients, by a backpropagation method, which corrects the newly-set coupling coefficients in order from a coupling coefficient between nodes located in an output layer side of the newly-constructed DNN from nodes contained in a learning device, so as to reduce an error between an input and an output in the newly-constructed DNN;

extracting the designated feature type in parallel, by the at least two registered DNN devices in the corrected newly-constructed DNN, and output a logical sum or a logical product of the extraction results of the designated feature type; and transmitting, to the third user terminal, the logical sum or the logical product of the extraction results of the user-selected feature type from the corrected newly-constructed DNN device, thereby the providing device provides the third user terminal with a newly-constructed DNN that is desired by a user of the third user terminal from among DNNs that are already constructed, and the user of the third user terminal can use the newly-constructed DNN without the conventional time period requirement for construction.

4. A non-transitory recording medium for a deep neural network (DNN) server that provides search results after user-selection-driven DNN construction from registered DNNs, the non-transitory recording medium comprising server-executable instructions that, when executed by a processor of the server, cause the server to:

receive, from a first terminal device, first identification information regarding a first trained DNN device, and receive, from a second terminal device, second identification information regarding a second trained DNN device, each of the first and second trained DNN devices having nodes: (i) that output results of calculations on input data, (ii) that are respectively connected to each other, and (iii) that perform feature extraction to obtain image or speech recognition results based on user input, the first trained DNN and the second trained DNN extracting different types of features;

register, by storing, in a memory, as registered trained DNN device information, the first identification information and the second identification information, the first identification information and the second identification information indicating types of features that the respective trained DNN devices are capable of extracting;

accept designation, over the network via the network communication interface, from a third terminal device of a user, of a feature type that is to be extracted;

select at least two select at least two registered trained DNN devices that are capable of extracting respective types of features relevant to the designated feature type among the registered trained DNN devices having the registered trained DNN device information;

construct a new DNN device without the conventional learning time period restraints by newly setting connection coefficients between the nodes included in the at least two registered DNN devices, and adding together the newly set connection coefficients between the nodes contained in the at least two registered DNN devices;

correct the newly-set connection coefficients, by a back-propagation method, which corrects the newly-set coupling coefficients in order from a coupling coefficient between nodes located in an output layer side of the newly-constructed DNN from nodes contained in a learning device, so as to reduce an error between an input and an output in the newly-constructed DNN;

extract the designated feature type in parallel, by the at least two registered DNN devices in the corrected newly-constructed DNN, and output a logical sum or a logical product of the extraction results of the designated feature type; and transmit, to the third user terminal, the logical sum or the logical product of the extraction results of the designated feature type from the corrected newly-constructed DNN device, thereby the providing device provides the third user terminal with a newly-constructed DNN that is desired by a user of the third user terminal from among DNNs that are already constructed, and the user of the third user terminal can use the newly-constructed DNN without the conventional time period requirement for construction.

5. The DNN server according to claim 1, wherein the processor is further programmed to:
   perform learning on the newly-constructed DNN device so as to be able to extract the designated feature type.

6. The DNN server according to claim 1, wherein the processor is further programmed to provide the corrected new DNN in a private area that is open to only the user of the third terminal device and is closed to other third parties, and store the corrected new DNN in a storage area in the memory that can be accessed by only the user of the third terminal device.

* * * * *